United States Patent
Puigardeu Aramendia et al.

(10) Patent No.: US 11,225,014 B2
(45) Date of Patent: Jan. 18, 2022

(54) 3D PART CONTROL USING MULTIPLE PASS LIQUID DELIVERY

(71) Applicant: Hewlett-Packard Development Company, L.P., Houston, TX (US)

(72) Inventors: Sergio Puigardeu Aramendia, Corvallis, OR (US); David Ramirez Muela, Sant Cugat del Valles (ES); Pol Fornos, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 355 days.

(21) Appl. No.: 16/094,437

(22) PCT Filed: May 12, 2016

(86) PCT No.: PCT/US2016/032085
§ 371 (c)(1),
(2) Date: Oct. 17, 2018

(87) PCT Pub. No.: WO2017/196340
PCT Pub. Date: Nov. 16, 2017

(65) Prior Publication Data
US 2019/0118463 A1 Apr. 25, 2019

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/245* (2017.08);
(Continued)

(58) Field of Classification Search
CPC .................................................. B29C 64/165
See application file for complete search history.

(56) References Cited

U.S. PATENT DOCUMENTS

| 5,807,437 A | 9/1998 | Sachs et al. |
| 7,589,868 B2 | 9/2009 | Velde et al. |

(Continued)

FOREIGN PATENT DOCUMENTS

| CN | 105437543 A | 3/2016 |
| WO | WO-1994/19112 | 9/1994 |

(Continued)

OTHER PUBLICATIONS

F. Rengier, et al., "3D Printing Based on Imaging Data: Review of Medical Applications", Jul. 2010, 8 pages. https://www.researchgate.net/profiie/Hendrik__Von__Tengg-Kobligk2/publication/225474179_3D__printing__based_on_imaging_data_Review_of_medical_applications/links/557ffe7e08aeea18b77a4953.pdf.

(Continued)

*Primary Examiner* — Larry W Thrower
(74) *Attorney, Agent, or Firm* — Mannava & Kang (57) ABSTRACT

According to an example, a 3D printer may include a delivery device and a controller. The controller may access a morphology of a part to be formed from a plurality of build materials in a layer, determine, based upon the accessed morphology, a first delivery pattern for the delivery device to selectively deliver liquid droplets onto build materials in the layer during a first pass over the layer and a second delivery pattern for the delivery device to selectively deliver liquid droplets onto build materials in the layer during a second pass over the layer to control a property of the part formed of some of the build materials in the layer. The controller may also control the delivery device to selectively deliver liquid droplets onto build materials in the layer according to the determined first and second delivery patterns respectively during the first pass and the second pass.

8 Claims, 4 Drawing Sheets

(51) Int. Cl.
- *B33Y 50/02* (2015.01)
- *B29C 64/393* (2017.01)
- *B29C 64/245* (2017.01)
- *B29C 64/209* (2017.01)
- *B33Y 30/00* (2015.01)

(52) U.S. Cl.
CPC ............ *B29C 64/393* (2017.08); *B33Y 10/00* (2014.12); *B33Y 50/02* (2014.12); *B33Y 30/00* (2014.12)

(56) References Cited

U.S. PATENT DOCUMENTS

| | | |
|---|---|---|
| 8,874,248 B2 | 10/2014 | Young et al. |
| 2002/0111707 A1 | 8/2002 | Li et al. |
| 2004/0003738 A1 | 1/2004 | Imiolek et al. |
| 2004/0003741 A1 | 1/2004 | Iskra et al. |
| 2004/0251574 A1 | 12/2004 | Collins et al. |
| 2015/0086754 A1 | 3/2015 | Van De Vrie et al. |
| 2015/0145910 A1 | 5/2015 | Libinson |
| 2015/0197063 A1 | 7/2015 | Shinar et al. |
| 2015/0273769 A1 | 10/2015 | Korn |
| 2015/0314530 A1 | 11/2015 | Rogren |
| 2015/0352790 A1 | 12/2015 | Hadas |
| 2016/0059491 A1 | 3/2016 | Lee et al. |

FOREIGN PATENT DOCUMENTS

| | | |
|---|---|---|
| WO | WO-9419112 | 9/1994 |
| WO | WO-2015108546 A2 | 7/2015 |
| WO | WO-2016053312 A1 | 4/2016 |
| WO | WO-2016053364 | 4/2016 |

OTHER PUBLICATIONS

International Search Report and Written Opinion dated Feb. 3, 2017, PCT Patent Application No. PCT/US2016/032085, filed May 12, 2016, Korean Intellectual Property Office, 13 pages.

3D PART CONTROL USING MULTIPLE PASS LIQUID DELIVERY

CLAIM FOR PRIORITY

The present application is a national stage filing under 35 U.S.C. § 371 of PCT application number PCT/US2016/032085, having an international filing date of May 12, 2016, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer, and a computer readable medium on which is stored instructions corresponding to the methods. In the methods, a controller may determine a plurality of delivery patterns to be implemented in controlling a first delivery device to deliver liquid droplets as the first delivery device is moved over a layer of build materials in multiple passes. That is, the controller may determine a first delivery pattern to be implemented to control the first delivery device during a first pass and a second delivery pattern to be implemented to control the first delivery device during a second pass. The controller may also determine multiple delivery patterns to be implemented to control a second delivery device (and additional delivery devices) during the multiple passes. In one regard, by splitting up the delivery of the liquid droplets from either or both of the first delivery device and the second delivery device, a part may be formed from the build materials to have a predetermined property.

As discussed in greater detail herein below, the controller may determine the delivery patterns for the first delivery device and/or the second delivery device based upon information regarding formation of the part. The information may include a morphology of the part, detected temperatures of the build materials used to form the part, etc. In any regard, the delivery of liquid droplets, such as fusing agents, may be split among multiple passes to control a property of the part, in which the property may include thermal performance, mechanical strength, color, roughness/finishing, a combination thereof, etc.

Figure 1:
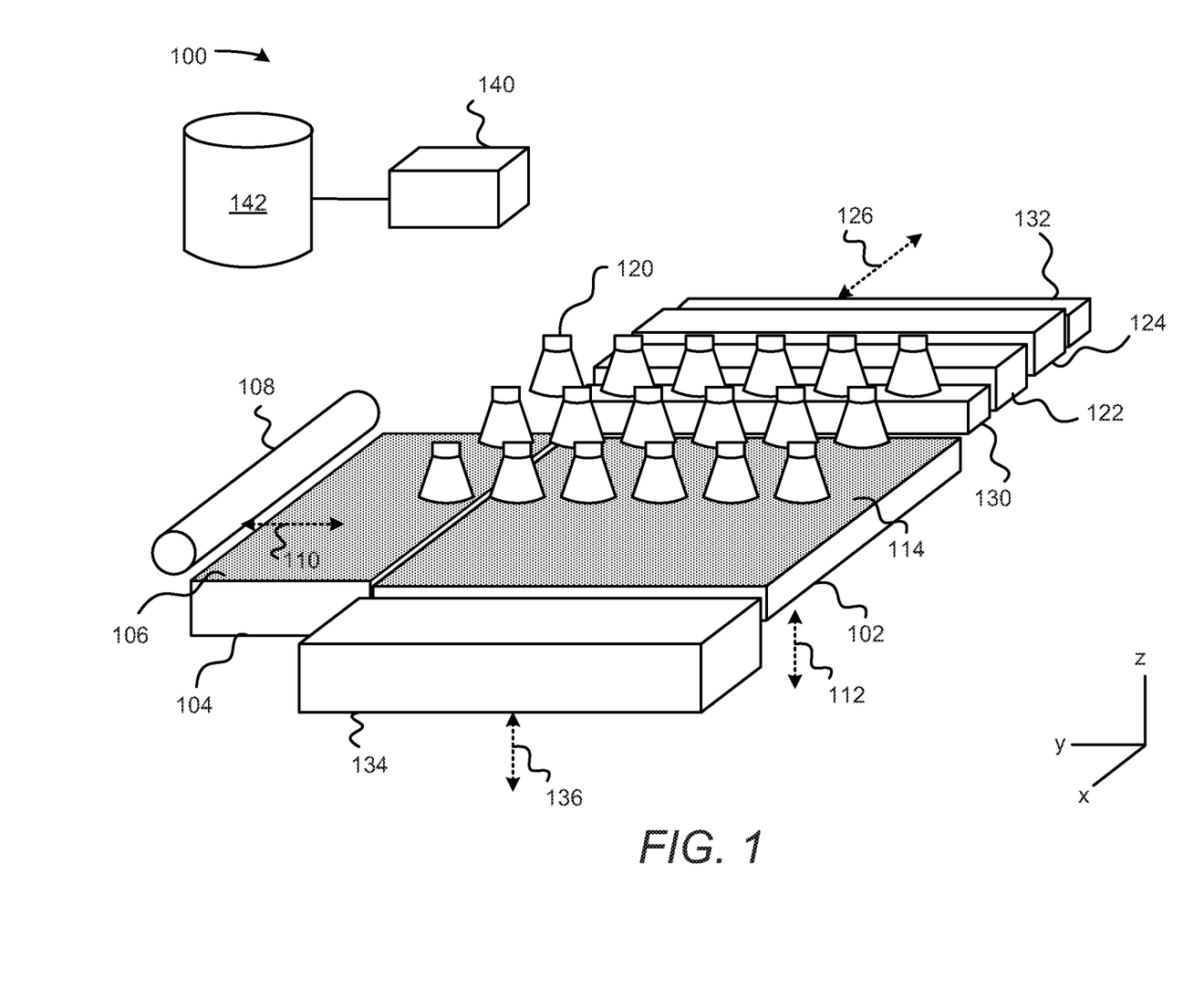
FIG. 1 shows a simplified isometric view of an example three-dimensional (3D) printer for generating, building, or printing three-dimensional parts.

With reference first to FIG. 1, there is shown a simplified isometric view of an example three-dimensional (3D) printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread the build materials 106 into a layer 114 over a surface of the build area platform 102. The layer 114 may be formed to a substantially uniform thickness across the build area platform 102. In an example, the thickness of the layer 114 may range from about 90 μm to about 110 μm, although thinner or thicker layers may also be used. For example, the thickness of the layer 114 may range from about 20 μm to about 200 μm, or from about 50 μm to about 200 μm. The recoater 108 may also be returned to a position adjacent the build material supply 104 following the spreading of the build materials 106. In addition, or alternatively, a second build material supply (not shown) may be provided on an opposite side of the build area platform 102 and the recoater 108 may be positioned over the second build material supply after forming the layer of build materials 106. The recoater 108 may be a doctor blade, roller, a counter rotating roller or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source that is to apply heat onto spread layers of the build materials 106, for instance, to maintain the build materials 106 within a predetermined temperature range. The warming devices 120 may maintain the temperatures of the build materials 106 at a relatively high temperature that facilitates the selective fusing of the build materials 106. That is, the warming devices 120 may maintain the build materials 106 at a sufficiently high temperature that enables the build materials 106 upon which fusing agent droplets are provided to fuse together upon receipt of fusing radiation without causing the build materials 106 to otherwise fuse together. The warming devices 120 may be activated in a non-continuous manner such that the build materials 106 may be kept within a predetermined temperature range as various processes, including application of fusing radiation, are performed on the build materials 106.

The 3D printer 100 is further depicted as including a first delivery device 122 and a second delivery device 124, which may both be scanned across the layer 114 on the build area platform 102 in both of the directions indicated by the arrow 126, e.g., along the x-axis. For instance, the first delivery device 122 may deposit first liquid droplets as the first delivery device 122 is scanned in a first direction 126 along the x-axis and the second delivery device 124 may deposit second liquid droplets as the second delivery device 124 is scanned in an opposite second direction 126 along the x-axis. The first delivery device 122 and the second delivery device 124 may be thermal inkjet printheads, piezoelectric printheads, or the like, and may extend a width of the build area platform 102. The first delivery device 122 and the second delivery device 124 may each include a printhead or multiple printheads available from the Hewlett Packard Company of Palo Alto, Calif. Although the first delivery device 122 and the second delivery device 124 have each been depicted in FIG. 1 as being formed of separate devices, it should be understood that each of the first delivery device 122 and the second delivery device 124 may be included on the same printhead. For instance, the first delivery device 122 may include a first set of actuators and nozzles in a printhead and the second delivery device 124 may include a second set of actuators and nozzles in the printhead.

In other examples in which the first delivery device 122 and the second delivery device 124 do not extend the width of the build area platform 102, the first delivery device 122 and the second delivery device 124 may also be scanned along the y-axis to thus enable the first delivery device 122 and the second delivery device 124 to be positioned over a majority of the area above the build area platform 102. The first delivery device 122 and the second delivery device 124 may thus be attached to a moving XY stage or a translational carriage (neither of which is shown) that is to move the first delivery device 122 and the second delivery device 124 adjacent to the build area platform 102 in order to deposit respective liquids in predetermined areas of the layer 114 of the build materials 106.

Although not shown, the first delivery device 122 and the second delivery device 124 may each include a plurality of nozzles through which the respective liquid droplets are to be ejected onto the layer 114. The first delivery device 122 may deposit a first liquid and the second delivery device 124 may deposit a second liquid. The first liquid and the second liquid may both be fusing agents, may both be detailing agents, or one may be a fusing agent and the other may be a detailing agent. A fusing agent may be a liquid that is to absorb fusing radiation (e.g., in the form of light and/or heat) to cause the build materials 106 upon which the fusing agent has been deposited to fuse together when the fusing radiation is applied. A detailing agent may be a liquid that may absorb significantly less of the fusing radiation as compared with the fusing agent. In one example, the detailing agent may prevent or significantly reduce the fusing together of the build materials 106 upon which the detailing agent has been deposited. In other examples, the detailing agent may be implemented to provide coloring to exterior portions of the build materials 106 that have been fused together.

The first liquid and the second liquid may also include various additives and/or catalysts that either enhance or reduce radiation absorption. For instance, the first liquid may include a radiation absorbing agent, i.e., an active material, metal nanoparticles, or the like. The first liquid and the second liquid may also include any of a co-solvent, a surfactant, a biocide, an anti-kogation agent, a dispersant, and/or combinations thereof.

Although not shown, the 3D printer 100 may include additional delivery devices, e.g., printheads, that may deposit multiple liquids having different radiation absorption properties with respect to each other. By way of example, the multiple liquids may have different colors with respect to each other, may have different chemical compositions (e.g., different reactants and/or catalysts) with respect to each other, or the like. In the example in which the 3D printer 100 may deposit multiple liquids, the 3D printer 100 may include multiple printheads, in which each of the multiple printheads may deposit a liquid having a different radiation absorption property with respect to the other liquids.

According to an example, the first delivery device 122 may be controlled to selectively deliver first liquid droplets onto build materials 106 in a layer 114 of the build materials 106 during a first pass over the layer 114 and to deliver additional first liquid droplets onto build materials 106 in the layer 114 of build materials 106 during a second pass over the layer 114. The first delivery device 122 may further be controlled to deliver additional first liquid droplets onto build materials 106 in the layer 114 during a third pass over the layer of build materials 106, and so forth, over the same layer. For instance, in an example in which the first delivery device 122 is to deposit a predefined amount of first liquid droplets onto a selected area of build materials 106 in the layer 114, the first delivery device 122 may be controlled to deposit a portion of the predefined amount onto the selected area of build materials 106 during the first pass and the remaining portion of the predefined amount onto the selected area of build materials 106 during the second pass.

As discussed in greater detail herein below, application of the first fluid droplets onto build materials 106 in the same layer 114 may be split over multiple passes to control a property of a 3D object being formed from the build materials 106 in that layer 114. The property of the 3D object may include, for instance, a mechanical property of the 3D object, a color property of the 3D object, a finishing property of the 3D object, combinations of various properties, and the like. A first pass may include moving the first delivery device 122 across a layer 114 of build materials 106 in a first direction 126 along the x-axis, and a second pass may include moving the first delivery device 122 across the same layer 114 in an opposite second direction 126 along the x-axis. Alternatively, a second pass may include moving the first delivery device 122 across the same layer 114 in the same direction 126 as the first direction 126, e.g., both in the same direction along the x-axis. The second delivery device 124 may also be controlled in similar manners to deposit second liquid during multiple passes.

Following deposition of the first liquid droplets and/or the second liquid droplets onto selected areas of the layer 114 of the build materials 106, a first fusing radiation generator 130 and/or a second fusing radiation generator 132 may be implemented to apply fusing radiation onto the build materials 106 in the layer 114. Particularly, the fusing radiation generator(s) 130, 132 may be activated and moved across the layer 114, for instance, along the directions indicated by the arrow 126 to apply fusing radiation in the form of light and/or heat onto the build materials 106. Examples of the fusing radiation generators 130, 132 may include UV, IR or near-IR curing lamps, IR or near-IR light emitting diodes (LED), halogen lamps emitting in the visible and near-IR range, or lasers with desirable electromagnetic wavelengths. The types of fusing radiation generators 130, 132 may depend, at least in part, on the type of active material used in the liquid(s). According to an example, the first delivery device 122, the second delivery device 124, the first fusing radiation generator 130, and the second fusing radiation generator 132 may be supported on a carriage (not shown) that may be scanned over the build area platform 102 in the directions denoted by the arrow 126.

Either or both of the fusing radiation generators 130, 132 may be controlled to apply fusing radiation between the first pass and the second pass, as well as between additional passes. In addition, or alternatively, either or both of the fusing radiation generators 130, 132 may be controlled to apply fusing radiation after the first pass and the second pass, as well as additional passes, have been performed.

Following application of liquid droplets during the multiple passes and following application of the radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer 114. Moreover, the first delivery device 122 may deposit first liquid droplets and the second delivery device 124 may deposit second liquid droplets onto respective selected areas of the new layer of build materials 106 in single and/or multiple passes as discussed above. The above-described process may be repeated until parts of the 3D object have been formed in a predetermined number of layers to fabricate the 3D object.

Additionally, following a liquid deposition operation across a build material layer or following multiple liquid deposition operations across multiple build material layers, the first delivery device 122 and the second delivery device 124 may be positioned adjacent to a wiping mechanism 134. The wiping mechanism 134 may wipe the nozzles of the first delivery device 122 and the second delivery device 124, as well as the nozzles of additional delivery devices if included in the 3D printer 100. The wiping mechanism 134 may be moved to a position in which a surface, such as a cleaning web (not shown), of the wiping mechanism 134 is in contact with the exterior surfaces of the nozzles. The wiping mechanism 134 may be moved in the z-direction as noted by the arrow 136 to remove debris such as, build materials 106, liquid, dust, etc., that may be in contact with the exterior surfaces of the first delivery device 122 and the second delivery device 124, to maintain the delivery devices 122, 124 at or above desired performance levels.

As further shown in FIG. 1, the 3D printer 100 may include a controller 140 that may control operations of the build area platform 102, the build material supply 104, the recoater 108, the warming devices 120, the first delivery device 122, the second delivery device 124, the fusing radiation generators 130, 132, and the wiping mechanism 134. Particularly, for instance, the controller 140 may control actuators (not shown) to control various operations of the 3D printer 100 components. The controller 140 may be a computing device, a semiconductor-based microprocessor, a central processing unit (CPU), an application specific integrated circuit (ASIC), and/or other hardware device. Although not shown, the controller 140 may be connected to the 3D printer 100 components via communication lines.

The controller 140 is also depicted as being in communication with a data store 142. The data store 142 may include data pertaining to a 3D object to be printed by the 3D printer 100. For instance, the data may include the locations in each build material layer that the first delivery device 122 is to deposit a first liquid and that the second delivery device 124 is to deposit a second liquid to form the 3D object. In one example, the controller 140 may use the data to control the locations on each of the build material layers that the first delivery device 122 and the second delivery device 124 respectively deposit droplets of the first and second liquids.

Figure 2:
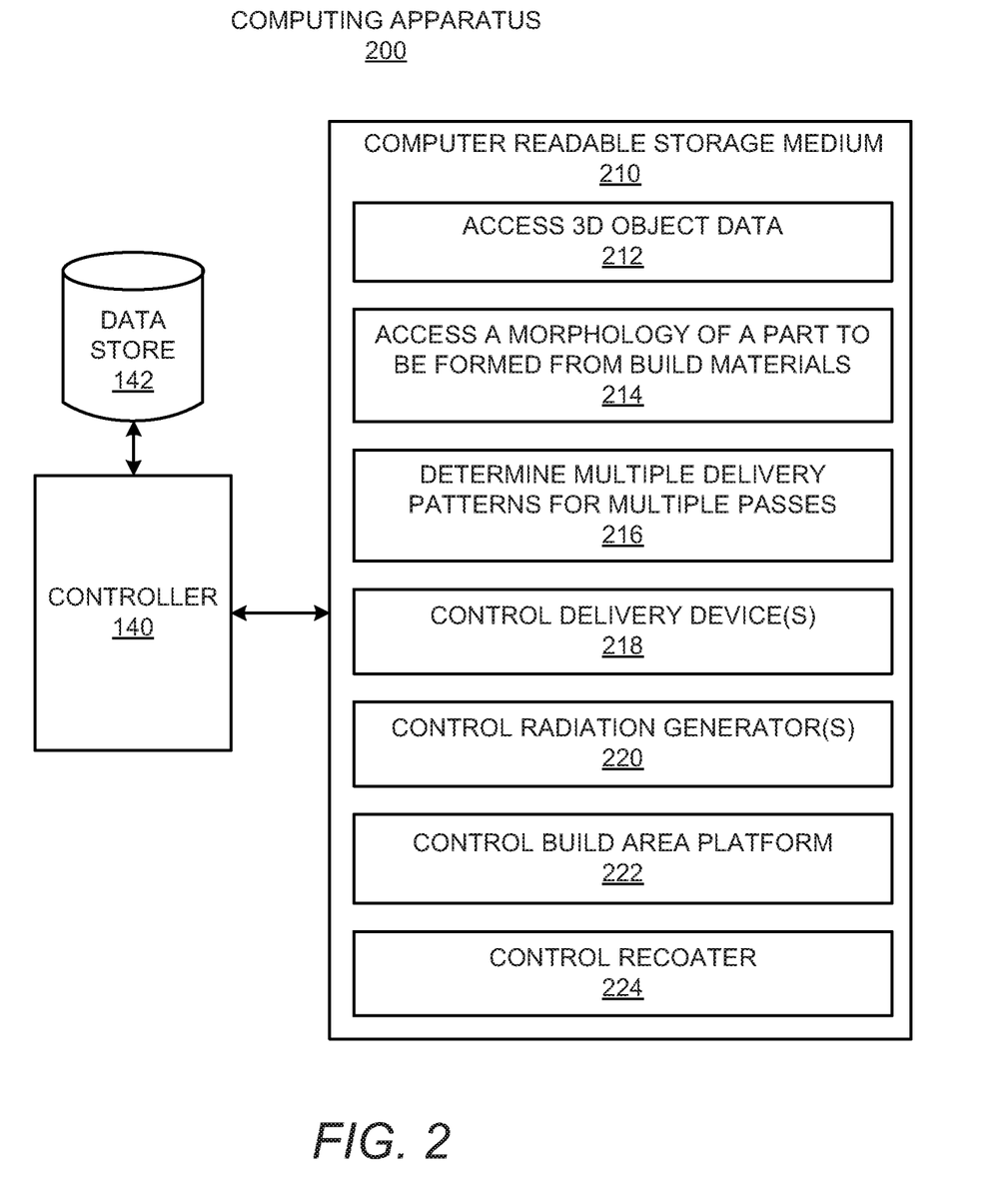
FIG. 2 shows a simplified block diagram of an example computing apparatus that may be implemented in the 3D printer depicted in FIG. 1.

Turning now to FIG. 2, there is shown a simplified block diagram of an example computing apparatus 200. According to an example, the computing apparatus 200 may be implemented as part of the 3D printer 100. For instance, the computing apparatus 200 may be a command module or other control system of the 3D printer 100. In another example, the computing apparatus 200 may be separate from the 3D printer 100 and may be, for instance, a personal computer, a laptop computer, a server computer, or the like. It should be understood that the computing apparatus 200 depicted in FIG. 2 may include additional components and that some of the components described herein may be removed and/or modified without departing from a scope of the computing apparatus 200 disclosed herein.

The computing apparatus 200 is shown as including a controller 140 and a data store 142, which may be the same as the controller 140 and the data store 142 depicted in and described above with respect to FIG. 1. As such, the controller 140 and the data store 142 depicted in FIG. 2 are not described in detail and instead, the descriptions of the controller 140 and the data store 142 provided above with respect to the 3D printer 100 are intended to also describe these components with respect to the computing apparatus 200.

The computing apparatus 200 may also include a computer readable storage medium 210 on which is stored machine readable instructions 212-224 that the controller 140 may execute. More particularly, the controller 140 may fetch, decode, and execute the instructions 212-224 to access data pertaining to a 3D object to be printed 212, access a morphology of a part of the 3D to be formed from build materials 106 in a layer 214, determine multiple delivery patterns for multiple passes 216, control a delivery device or multiple delivery devices 218, control a fusing radiation generator or multiple fusing radiation generators 220, control a build area platform 222, and control a recoater 224. As an alternative or in addition to retrieving and executing instructions, the controller 140 may include one or more electronic circuits that include components for performing the functionalities of the instructions 212-224. In any regard, and as discussed above, the controller 140 may communicate instruction signals to the various components of the 3D printer 100 via communication lines such that the components may operate in the manners described herein.

The computer readable storage medium 210 may be any electronic, magnetic, optical, or other physical storage device that contains or stores executable instructions. Thus, the computer readable storage medium 210 may be, for example, Random Access Memory (RAM), an Electrically Erasable Programmable Read-Only Memory (EEPROM), a storage device, an optical disc, and the like. The computer readable storage medium 210 may be a non-transitory machine-readable storage medium, where the term "non-transitory" does not encompass transitory propagating signals.

Figure 3:
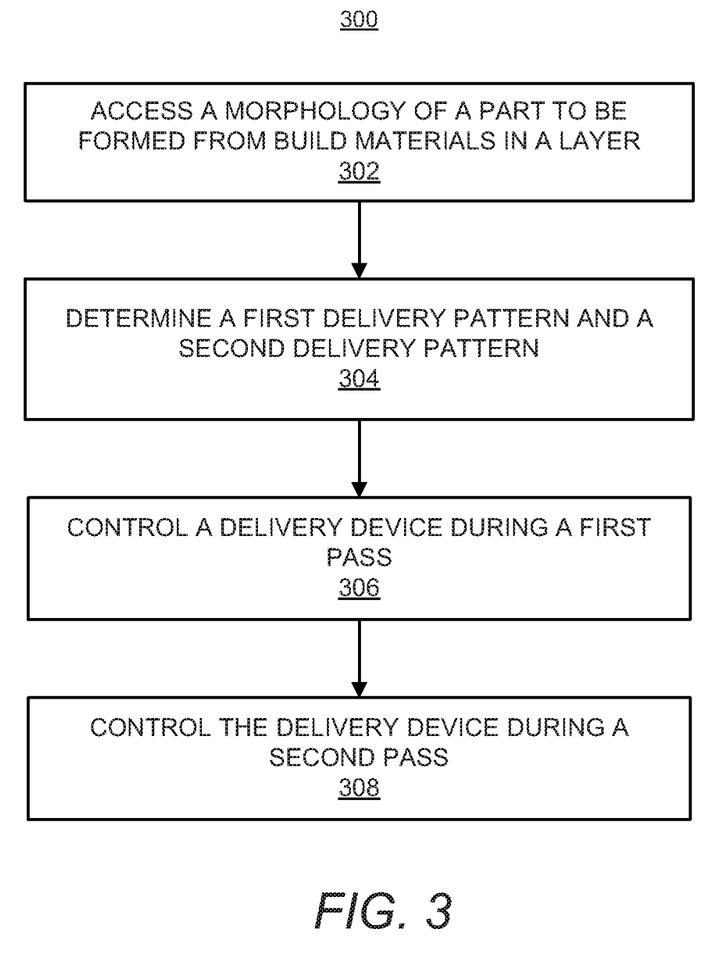
FIGS. 3 and 4, respectively, depict example methods for controlling delivery of liquid droplets during multiple passes to control a property of build materials in a layer of build materials that are to be formed into a part of a 3D object.
Figure 4:
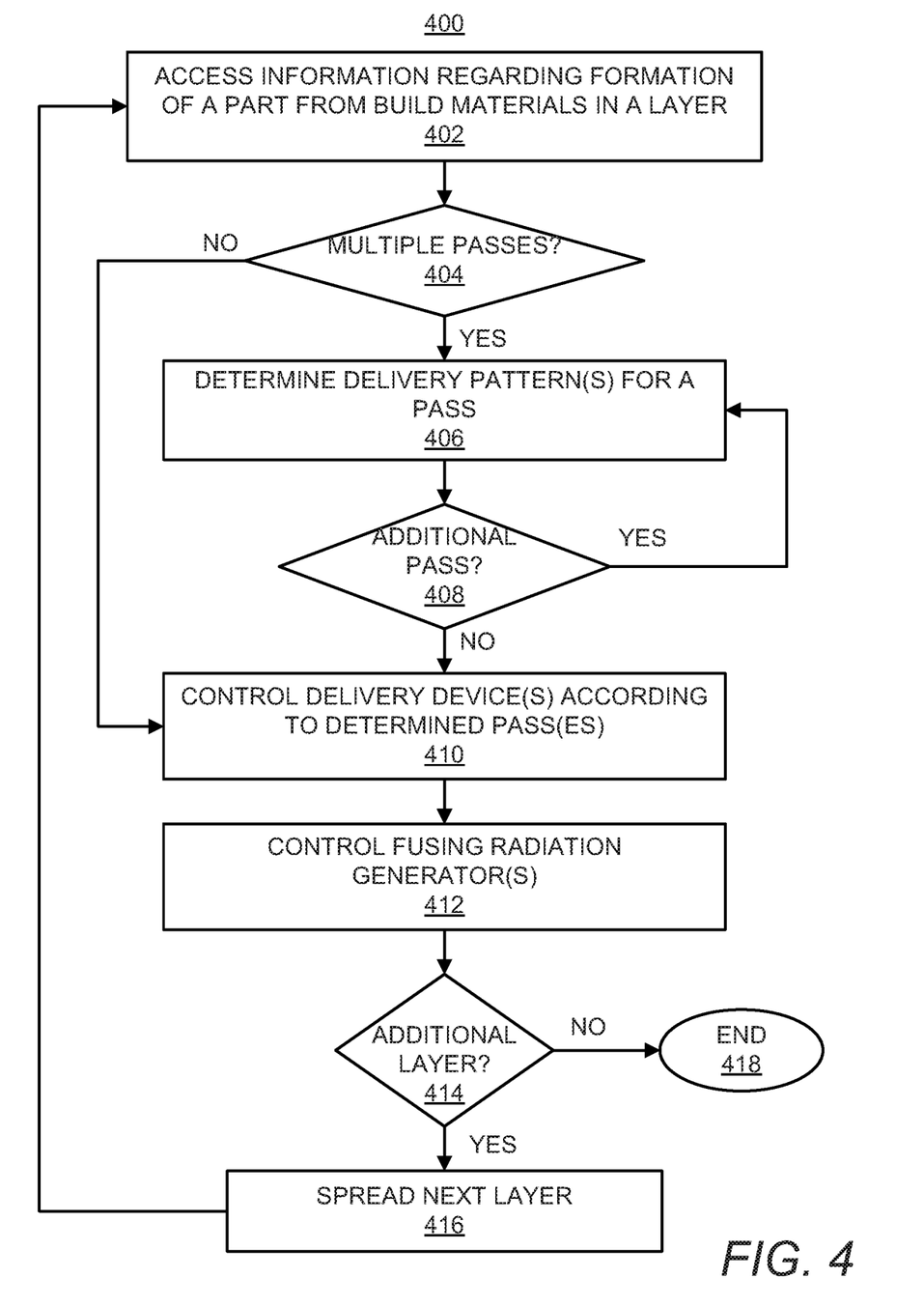

Various manners in which the computing apparatus 200 may be implemented are discussed in greater detail with respect to the methods 300 and 400 respectively depicted in FIGS. 3 and 4. Particularly, FIGS. 3 and 4, respectively, depict example methods 300 and 400 for controlling delivery of liquid droplets during multiple passes to control a property of build materials 106 in a layer 114 of build materials 106 that are to be formed into a part of a 3D object. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the 3D printer 100 illustrated in FIG. 1 and the computing apparatus 200 illustrated in FIG. 2 for purposes of illustration. It should, however, be clearly understood that 3D printers and computing apparatuses having other configurations may be implemented to perform either or both of the methods 300 and 400 without departing from the scopes of the methods 300 and 400.

Prior to execution of either of the methods 300 and 400 or as parts of the methods 300 and 400, the controller 140 may execute instructions 212 stored on the computer-readable medium 210 to access data pertaining to a 3D object that is to be printed. By way of example, the controller 140 may access data stored in the data store 142 pertaining to a 3D object that is to be printed. The controller 140 may determine the number of layers 114 of build material 106 that are to be formed and the locations at which first liquid droplets and/or second liquid droplets are to be deposited on each of the respective layers of build material 106 in order to print the 3D object. The controller 140 may further determine when each of the recoater 108, the first delivery device 122, the second delivery device 124, the first fusing radiation generator 130, and the second fusing radiation generator 132 are to be moved across the build area platform 102 during each layer processing operation. In other examples, however, a processing device (not shown) outside of the 3D printer 100 may execute instructions to access the 3D object data and to make these determinations. In these examples, the processing device may communicate this information to the controller 140 and the controller 140 may implement this information in executing either or both of the methods 300 and 400.

With reference first to FIG. 3, at block 302, a morphology of a part to be formed from a plurality of build materials 106 in a layer 114 of the build materials may be accessed. For instance, the controller 140 may execute the instructions 214 to access the morphology of the part, which may form part of a 3D object. The controller 140 may access the morphology of the part from data stored in the data store 142 and/or from an external source via a network connection (not shown). For instance, the morphology of the part to be formed in the layer 114 may have been determined during access of the 3D object data as discussed above. In addition or alternatively, the controller 140 may access the morphology from data inputted by a user. In any regard, the morphology of the part to be formed from build materials 106 in the layer 114 may include information pertaining to distances between boundaries of the part and other parts to be formed of other build materials 106 in the layer 114, expected temperatures across the build materials 106 in the layer 114 during formation of the part, distances along the x-axis and the y-axis to a surface of the part, a distance along the z-axis to the part surface, a maximum distance to a surface of the part, combinations thereof, and the like. According to an example, the morphology information may be used to identify whether the part is a relatively large part or a relatively small feature or a detail and the part may be treated differently depending upon the identified characteristic of the part. For instance, the amounts of liquid droplets in different printing passes may differ depending upon the identified characteristic of the part.

At block 304, a first delivery pattern for a delivery device 122 in selectively delivering liquid droplets onto build materials 106 in the layer 114 during a first pass over the layer 114 and a second delivery pattern for the delivery device 122 in selectively delivering liquid droplets onto build materials 106 in the layer 114 during a second pass over the layer 114 may be determined based upon the accessed morphology. Particularly, for instance, the controller 140 may execute the instructions 216 to determine the first delivery pattern and the second delivery pattern, in which the delivery of the liquid droplets over the multiple passes is to control a property of the formed part. That is, the controller 140 may determine the first delivery pattern and the second delivery pattern to result in the formed part having a property that differs from a property that may have resulted if the liquid droplets are deposited during a single pass. According to an example, the controller 140 may determine the first delivery pattern and the second delivery pattern to be delivery patterns that are to result in the part having an improved property over a part that is formed through deposition of the liquid droplets during a single pass.

The first and second delivery patterns may have been determined through testing and/or interpolation of testing data. That is, various delivery patterns over multiple passes to form various parts having various morphologies (as well as other factors, such as build material temperatures) may be tested to determine properties of the various parts under the different delivery patterns and morphologies. Results from the testing may be stored in the data store 142, for instance in the form of a lookup table, and the controller 140 may access the lookup table to determine the first delivery pattern and the second delivery pattern to be implemented for a part based upon the accessed morphology of that part (and other information) and the desired property to be controlled. Examples of properties that may be controlled through implementation of the first delivery pattern during the first pass and the second delivery pattern during the second pass may include, for instance, thermal performance, mechanical strength, color, surface roughness, finishing, and the like.

The first delivery pattern may define the placements on the layer 114 at which the first delivery device 122 is to deliver liquid droplets during the first pass of the first delivery device 122 over the layer 114. Likewise, the second delivery pattern may define the placements on the layer 114 at which the first delivery device 122 is to deliver liquid droplets during the second pass of the first delivery device 122 over the layer 114. The placements on the layer 114 at which the liquid droplets are to be delivered according to the second delivery pattern may coincide with at least some of the placements on the layer 114 at which liquid droplets are to be delivered according to the first delivery pattern. In any regard, the first delivery pattern and the second delivery pattern may be print data that defines the timings at which liquid droplets are to be fired from selected nozzles in the first delivery device 122 as the first delivery device 122 is scanned over the layer 114.

At block 306, the delivery device 122 may be controlled to selectively deliver liquid droplets onto build materials 106 in the layer 114 according to the determined first delivery pattern during the first pass. For instance, the controller 140 may execute the instructions 218 to control the first delivery device 122 to selectively deliver liquid droplets according to the first delivery pattern as the first delivery device 122 is moved over the layer 114 during a first pass. The first pass may be the first pass corresponding to the first delivery device 122 being moved over the layer 114 after build materials 106 have been formed into the layer 114. Following block 306, build materials 106 in the layer 114 may have received the liquid droplets according to the first delivery pattern.

At block 308, the delivery device 122 may be controlled to selectively deliver liquid droplets onto build materials 106 in the layer 114 according to the determined second delivery pattern during the second pass. For instance, the controller 140 may execute the instructions 218 to control the first delivery device 122 to selectively deliver liquid droplets according to the second delivery pattern as the first delivery device 122 is moved over the layer 114 during a second pass. The second pass may be the pass corresponding to the first delivery device 122 being moved over the layer 114 after build materials 106 have been formed into the layer 114 and after the first pass has been performed. Following block 308, build materials 106 in the layer 114 may have received the liquid droplets according to the first delivery pattern and the second delivery pattern. In addition, some of the build materials 106 may have received the liquid droplets during each of the first and second passes or only during one of the first and second passes.

With reference now to FIG. 4, at block 402, the controller 140 may access information regarding formation of a part from build materials 106 in a layer 114 of the build materials 106. The controller 140 may execute the instructions 214 to access a morphology of the part to be formed from the build materials 106 as discussed above with respect to block 302 in FIG. 3. In addition, the controller 140 may access temperature information of the build materials 106 in the layer 114. For instance, a temperature sensor or thermal sensor (not shown) may detect the temperatures of the build materials 106 in the layer 114 and the controller 140 may access the detected temperatures. In one example, various locations across the layer 114 may have different temperatures with respect to each other based upon, for instance, because of thermal bleeding from heat applied to a previous layer.

At block 404, the controller 140 may determine whether multiple passes are to be implemented in delivering liquid droplets onto build materials 106 in the layer 114. The controller 140 may make this determination based upon whether a property of the part to be formed from the build materials 106 is to be controlled. For instance, the controller 140 may determine that the liquid droplets are to be delivered over multiple passes of a delivery device 122 in response to a determination that a property to be controlled is achievable through delivery of the liquid droplets over the multiple passes. By way of example, the property to be controlled may be a user-defined property, in which the controller 140 is instructed or programmed to control the property of the part.

In response to a determination that multiple passes are to be implemented in delivering liquid droplets onto build materials 106 in the layer 114, a first delivery pattern for a first delivery device 122 may be determined as indicated at block 406. In addition, a first delivery pattern for a second delivery device 124 may also be determined at block 406. The controller 140 may execute the instructions 216 to determine the first delivery pattern for either or both of the first delivery device 122 and the second delivery device 124.

At block 408, the controller 140 may also determine whether the first delivery device 122 and/or the second delivery device 124 are to deliver liquid droplets during an additional pass. In response to a determination that the first delivery device 122 and/or the second delivery device 124 are to deliver liquid droplets during an additional pass, the controller 140 may repeat blocks 406 and 408. In this regard, at block 406, the controller 140 may execute the instructions 216 to determine a second delivery pattern for the first delivery device 122 and/or a second delivery pattern for the second delivery device 124. In addition, the controller 140 may repeat blocks 406 and 408 to determine additional delivery patterns for the first delivery device 122 and/or the second delivery device 124 until the controller 140 determines that no additional passes are to be implemented. The controller 140 may determine the number of passes and the delivery patterns to be implemented in selectively depositing liquid droplets onto the layer 114 to control a predetermined property of the part based upon correlations between the property of the part to be controlled and the information regarding formation of the part, which may include the morphology of the part and the detected temperatures of the build materials 106 in the layer 114. As discussed above, the correlations may be determined through testing using different combinations of information regarding formation of the part and delivery patterns over multiple printing passes and/or interpolation of data resulting from the testing.

At block 410, following the "no" condition of block 404 or of block 408, the controller 140 may execute the instructions 218 to control the first delivery device 122 and/or the second delivery device 124 to selectively deliver liquid droplets onto build materials 106 in the layer 114 during a single pass or multiple passes over the layer 114. For instance, the controller 140 may control the first delivery device 122 to selectively deliver liquid droplets onto build materials 106 in the layer 114 during a single pass of the first delivery device 122 over the layer 114 in response to a determination at block 404 that multiple passes are not to be implemented. However, the controller 140 may control the first delivery device 122 to selectively deliver first liquid droplets onto build materials 106 in the layer 114 during multiple passes in response to a determination at block 404 that multiple passes are to be implemented. In addition, the controller 140 may control the first delivery device 122 to selectively deliver first liquid droplets according to the determined delivery patterns for each of the multiple passes.

The controller 140 may also control the second delivery device 124 to selectively deliver second liquid droplets onto build materials 106 in the layer 114 during a single pass or over multiple passes. In addition, the controller 140 may control the second delivery device 124 to selectively deliver second liquid droplets according to the determined delivery patterns for each of the multiple passes.

According to an example, the first delivery pattern for the first delivery device 122 may cause first liquid droplets to be selectively delivered at first locations during a first pass and the first delivery pattern for the second delivery device 124 may cause second liquid droplets to be selectively delivered at second locations during the first pass. In addition, the second delivery pattern for the first delivery device 122 may cause first liquid droplets to be selectively delivered at third locations during a second pass and the second delivery pattern for the second delivery device 124 may cause second liquid droplets to be selectively delivered at fourth locations during the second pass. In one regard, the timing at which the first liquid droplets and the second liquid droplets are delivered may be varied for different locations on the layer 114, which may result in the part formed using the first liquid droplets and the second liquid droplets to have certain properties.

At block 412, the controller 140 may execute the instructions 220 to control either or both of the fusing radiation generators 130, 132 to provide fusing radiation onto the build materials 106 in the layer 114. The fusing radiation may cause the build materials 106 upon which either or both of the first liquid droplets and the second liquid droplets have been deposited to be fused together. Although the fusing radiation has been described as being applied following the deposition of the first liquid droplets and/or the second liquid droplets during multiple passes, in other examples, fusing radiation may be applied between passes, i.e., multiple times on the same layer 114 between two passes. In examples in which fusing radiation is applied between passes, fusing radiation may be applied to apply additional control in the fusing of the build materials 106, which may assist in the part being formed with a desired property.

At block 414, the controller 140 may determine whether an additional layer of build materials 106 is to be formed. The controller 140 may make this determination, for instance, based upon accessed information regarding the 3D part to be printed. In response to a determination that an additional layer is to be formed, a next layer of build materials 106 may be spread on top of the layer 114, as indicated at block 416. For instance, the controller 140 may execute the instructions 222 to control the build area platform 102 to be moved downward and may execute the instructions 224 to control the recoater 108 to spread additional build materials 106 across the layer 114. In addition, blocks 402-416 may be repeated until no additional layers are to be formed, at which point the method 400 may end, as indicated at block 418.

Although particular reference is made herein to a first delivery pattern and a second delivery pattern for the first delivery device 122 and the second delivery device 124, it should be understood that additional delivery patterns may be determined and implemented on either or both of the delivery devices 122, 124 to achieve desired formed part properties without departing from scopes of the present disclosure. In addition, although particular reference is made to the first delivery device 122 and the second delivery device 124, it should be understood that various features disclosed herein may be implemented in additional delivery devices.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) printer comprising:
a first delivery device to selectively deliver first liquid droplets onto a first layer of build materials as the first delivery device is scanned across the first layer; and
a controller to:
access a morphology of a part to be formed from the first layer of the build materials, wherein the morphology of the part comprises expected temperatures across the first layer of the build materials;
determine a certain amount of the first liquid droplets to be delivered onto the first layer of the build materials to form a portion of the part in the first layer of the build materials;
split the certain amount of the first liquid droplets into a first amount to be delivered during a first pass of the first delivery device and a second amount to be delivered during a second pass of the first delivery device, wherein the first amount and the second amount are determined based on the expected temperatures across the first layer of the build materials; and
control the first delivery device to selectively deliver the first amount of the first liquid droplets onto the first layer of the build materials according to a first delivery pattern during the first pass and the second amount of the first liquid droplets onto the first layer of the build materials according to a second delivery pattern during the second pass.

2. The 3D printer according to claim 1, further comprising:
a fusing radiation generator to apply fusing radiation onto the first layer of build materials as part of a layer processing operation, and wherein the second pass of the first delivery device occurs at least one of prior to and following the fusing radiation generator applying fusing radiation onto the first layer during the layer processing operation after the first pass.

3. The 3D printer according to claim 1, wherein the morphology of the part further comprises distances between boundaries of the part and other parts to be formed of other build materials in the first layer.

4. The 3D printer according to claim 1, further comprising:
a second delivery device to selectively deliver second liquid droplets onto the build materials in the first layer as the second delivery device is scanned across the first layer; and
wherein the controller is further to:
determine, based upon the expected temperatures across the first layer of the build materials, a third delivery pattern for the second delivery device to selectively deliver the second liquid droplets onto the first layer of the build materials during a third pass; and
control the second delivery device to selectively deliver the second liquid droplets onto the first layer of the build materials in the first layer according to the determined third delivery pattern during the third pass.

5. The 3D printer according to claim 4, wherein the controller is further to determine, based upon the expected temperatures across the first layer of the build materials, a fourth delivery pattern for the second delivery device to selectively deliver the second liquid droplets onto the first layer of the build materials a fourth pass and to control the second delivery device to selectively deliver the second liquid droplets onto the first layer of the build materials according to the determined fourth delivery pattern during the fourth pass.

6. The 3D printer according to claim 4, wherein the first liquid droplets and the second liquid droplets have different radiation absorption properties with respect to each other.

7. The 3D printer according to claim 1, wherein the controller is further to access sensed temperature information of the build materials in the first layer and to implement the sensed temperature information to determine the first delivery pattern and the second delivery pattern.

8. The 3D printer according to claim 1, wherein the controller is to split the certain amount of the first liquid droplets into the first amount to be delivered during the first pass and the second amount to be delivered during the second pass to control a property of the part to be formed, wherein the property of the part to be formed comprises a mechanical property of the part, a color property of the part, a finishing property of the part, or a combination thereof.

* * * * *